United States Patent [19]
Granston et al.

[11] Patent Number: 5,966,538
[45] Date of Patent: Oct. 12, 1999

[54] METHOD AND APPARATUS FOR AUTOMATICALLY DETERMINING WHICH COMPILER OPTIONS SHOULD BE USED WHEN COMPILING A COMPUTER PROGRAM

[75] Inventors: Elana D. Granston, Sugarland, Tex.; Anne M. Holler, Santa Clara, Calif.

[73] Assignee: Hewlett-Packard Company, Palo Alto, Calif.

[21] Appl. No.: 08/960,527

[22] Filed: Oct. 31, 1997

[51] Int. Cl.$^6$ .................................................. G06F 9/45
[52] U.S. Cl. ................................................. 395/709
[58] Field of Search .................................. 395/709, 705

[56] References Cited

U.S. PATENT DOCUMENTS

| | | | |
|---|---|---|---|
| 5,133,072 | 7/1992 | Buzbee | 395/709 |
| 5,258,919 | 11/1993 | Yamanouchi et al. | 395/500.12 |
| 5,613,118 | 3/1997 | Heisch et al. | 395/709 |
| 5,815,720 | 9/1998 | Buzbee | 395/709 |

OTHER PUBLICATIONS

Chang et al. Using Profile Information to Assist Classic Code Optimizations, Software–Practice and Experience, pp. 1301–1321, 1991.
Bacon et al. Compiler transformation for high–performance computing, ACM Computing Survery, vol. 26, No. 4, 1994.

*Primary Examiner*—Tariq R. Hafiz
*Assistant Examiner*—Wei Zhen

[57] ABSTRACT

The present invention provides a method and apparatus for automatically determining which compiler options should be used in compiling a computer program. The present invention utilizes a set of encodable rules in combination with application-specific information obtained from a compiler user, and/or during the compilation process, and/or during run time, and which presents the compiler user with a set of recommended compiler options via a user interface. The user may then select the recommended compiler options to be applied on a program level, i.e., one set for an application, or on a module-per-module level, i.e., with potentially different recommendations for different modules of a program. The present invention utilizes user information obtained from interviewing the compiler user, such as, for example, failure tolerance, compile-time tolerance, application type, etc., compile-time information obtained during one or more compilations of the program, such as, for example, characteristics of loops and data access patterns, and profile information collected at run time, such as, for example, the number of times that a particular call site was invoked while running the particular application, the percentage of time spent in particular routines, etc. The rules then use the information obtained to automatically determine and recommend a set of application-specific compiler options.

52 Claims, 3 Drawing Sheets

METHOD AND APPARATUS FOR AUTOMATICALLY DETERMINING WHICH COMPILER OPTIONS SHOULD BE USED WHEN COMPILING A COMPUTER PROGRAM

TECHNICAL FIELD OF THE INVENTION

The present invention generally relates to a method and apparatus for automatically determining compiler options and, more particularly, to a method and apparatus for automatically determining which compiler options should be applied based on user information obtained from the user, and/or compile-time information obtained during the compilation process, and/or profile information collected at run time.

BACKGROUND OF THE INVENTION

The task of determining which compiler options to apply in compiling a particular application currently is performed manually by the compiler user. In order for the compiler user to determine which compiler options to apply in a particular situation, the compiler user usually must wade through a daunting set of documentation to find the appropriate set of compiler options to use in order to achieve good performance. While many optimization selections can yield substantial performance improvements under certain circumstances, the same optimizations may cause significant performance degradations or other problems under other circumstances. Therefore, not only is the compiler user confronted with the task of determining which compiler options to apply, if the compiler user does not know everything there is to know about the particular build environment in which the compiler is being used, the compiler options selected by the user may not be the appropriate compiler options to apply under the circumstances.

It would be advantageous to provide the compiler user with a tool which would allow the compiler user to easily determine which compiler options will optimize performance for a particular application. Currently, there apparently are no tools available on the market which assist the compiler user in determining which compiler options should be selected in order to optimize compiler performance. Accordingly, a need exists for a method and apparatus for automatically determining which compiler options should be used which increases compiler usability and raises the level of optimization realized by compiler users while, at the same time, simplifying the performance tuning process for compiler users.

SUMMARY OF THE INVENTION

The present invention provides a method and apparatus for automatically determining which compiler options should be used in compiling a computer program. The present invention utilizes a set of encodable rules in combination with application-specific information obtained from a compiler user, and/or during the compilation process, and/or during run time, and which presents the compiler user with a set of application-specific compiler option recommendations via a user interface. The user may then select the recommended compiler options to be applied on a program level, i.e., one set for an application, or on a module-per-module level, i.e., potentially different recommendations for different modules of a program.

In accordance with the preferred embodiment of the present invention, the present invention utilizes information obtained from interviewing the compiler user, compile-time information obtained during one or more compilations of the program, and profile information collected at run time. The information obtained from the compiler user may include, for example, information relating to failure tolerance, compile-time tolerance, application type, etc. The compile-time information may include, for example, information relating to characteristics of loops and data access patterns. The profile information may include, for example, information relating to the number of times that a particular call site was invoked while running the particular application, the percentage of time spent in particular routines, etc. The rules then use the information obtained to automatically determine and recommend a set of application-specific compiler options. The compiler user then decides whether to implement the recommended compiler options. Alternatively, the recommended compiler options may be automatically selected and applied once the present invention has determined which compiler options should be applied.

Other aspects and advantages of the present invention will become apparent from the following description, drawings and claims.

DETAILED DESCRIPTION OF THE INVENTION

Figure 1:
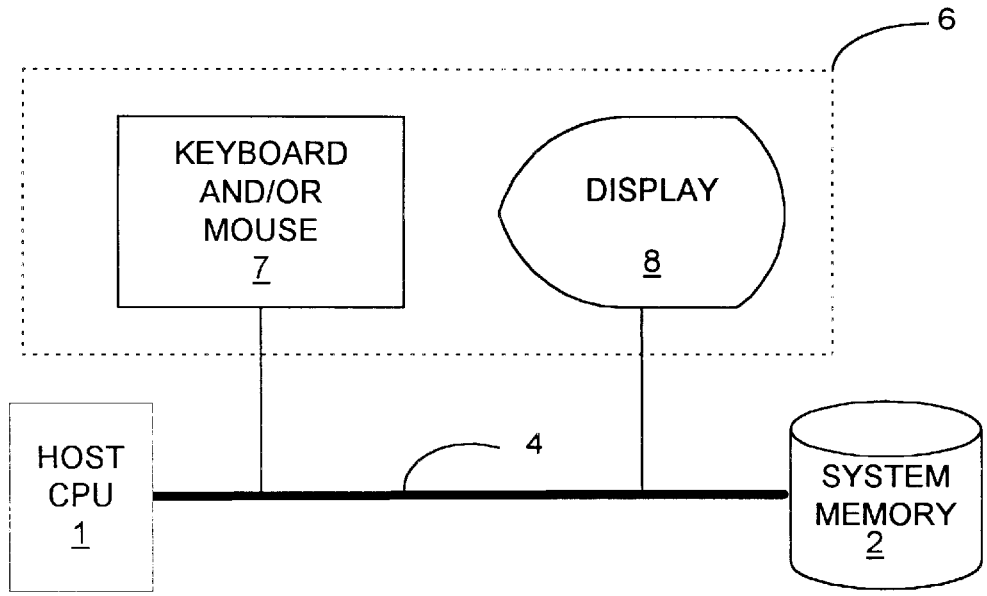
FIG. 1 is a block diagram which functionally illustrates the apparatus of the present invention.

FIG. 1 is a block diagram which illustrates the apparatus of the present invention. The apparatus of the present invention comprises a central processing unit (CPU) 1 which receives user information from a user interface 6, and/or compile time information obtained by CPU 1 during one or more compilations of a computer program, and/or profile information obtained by CPU 1 at run time. The CPU 1 then uses this information in combination with a set of rules to determine which compiler options should be applied when compiling the computer program in order to maximize compiler performance.

The rule sets are comprised as one or more optimization programs which are stored in system memory 2, which is in communication with host CPU 1 via system bus 4. It will be apparent to those skilled in the art, in view of the discussion provided herein, the manner in which suitable sets of rules can be developed in order to achieve the goals of the present invention. Therefore, in the interest of brevity, a detailed discussion of the sets of rules which may be utilized by the present invention to automatically determine compiler options will not be provided herein. It will be understood by those skilled in the art that, because of the vast number of application programs and types of application programs available now and which will become available in the future, virtually an infinite number of rule sets can be developed for automatically determining compiler options. Therefore, rather than describing multiple rule sets which may potentially be utilized by the present invention, an example demonstrating the application of a specific set of rules in a specific situation will be provided herein in order to adequately illustrate the concepts of the present invention. It will be apparent to those skilled in the art, in view of the discussion provided herein, the manner in which an optimization program can be developed which utilizes user information and/or compile-time information and/or profile information to determine which options should be applied in compiling a particular computer program.

It should also be noted that the present invention is not limited with respect to the manner in which the rule sets are selected and implemented. The present invention may utilize any method for determining which compiler options should be applied. In accordance with the preferred embodiment of the present invention, the rule sets utilize binary logic to determine which compiler options should be applied. Thus, the CPU 1 selects an appropriate set of rules and then selects the compiler options by applying these rules to the information obtained by the CPU 1. However, it will be apparent to those skilled in the art that other "intelligent" methods for selecting and applying rules may also be utilized by the present invention to determine which compiler options should be applied. For example, fuzzy logic may also be utilized to select a set of options and/or to determine which set of options constitute the best set of options under the particular circumstances. It will be apparent to those skilled in the art the manner in which such methods may be implemented with the present invention.

The user interface 6 preferably comprises a keyboard and/or mouse 7 to allow a compiler user to input information into CPU 1 and a display 8 which displays information to the compiler user. The user interface 6 is in communication with CPU 1 via system bus 4. Preferably, the user is presented with a graphical user interface (not shown) via display 8 from which the user makes appropriate selections. Once the CPU 1 has determined which compiler options should be applied when compiling a particular application program the CPU 1 recommends these compiler options to the compiler user by presenting them to the compiler user via display 8.

Figure 2:
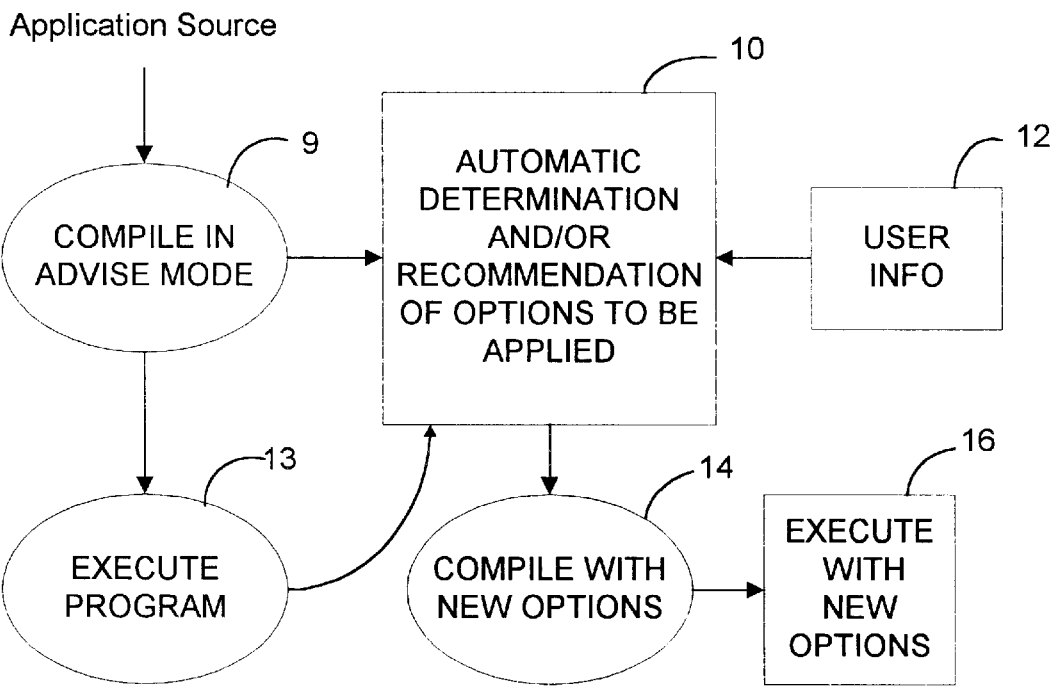
FIG. 2 is a block diagram which functionally illustrates the different types of information which may be utilized by the method and apparatus of the present invention to automatically determine and recommend application-specific compiler options to the user.

FIG. 2 is a chart illustrating certain types of information which may be obtained and utilized by the method and apparatus of the present invention in combination with a set of rules to determine and recommend compiler options to a compiler user. As stated above, the present invention may utilize user information, compile-time information and/or profile information to determine which compiler options should be applied in compiling a particular application. However, it will be understood by those skilled in the art that the present invention is not limited to only using these types of information and that any information which is useful in determining which compiler options should be recommended is suitable for use with the present invention. In accordance with the preferred embodiment of the present invention, at least compile-time information 9 is utilized by CPU 1 to determine which compiler options should be applied. The compile-time information 9 is computed at various points during program compilation by setting up the compiler so that the compiler obtains certain information during compile time and outputs this information during the compilation procedure. Most compilers have an advise-mode feature which allows the compile-time information to be obtained during compilation of a program and presented to the compiler user. It will be apparent to those skilled in the art the manner in which the compiler can be set up to output the compiler information to be utilized by the CPU 1.

The compiler, once set up, collects basic information such as, for example, language, routine and module sizes, and the current set of options being utilized by the compiler. The compiler may also collect more sophisticated information, such as information relating to situations where inter-procedural analysis might or might not improve compilation results, information relating to characteristics of loops and data access patterns within individual routines and modules, and information relating to particular optimizations that are or are not being activated when they are supposed to be activated.

At the very least, the CPU 1, running the optimization program 10, utilizes this compile-time information 9 to automatically determine and recommend compiler options. Preferably, the CPU 1 also obtains user information 12 from the compiler user. This user information may include the application type of the program (e.g., database applications, multimedia applications, scientific code applications, etc.), the user's failure tolerance and compile-time tolerance, the programming style used in writing the particular program, etc. Other types of user information which may be utilized and which are not specified herein will be apparent to those skilled in the art. Therefore, in the interest of brevity, a detailed listing of every type of user information which may be utilized by the present invention is not provided herein. If the information utilized by the CPU 1 includes user information 9, then the set of rules utilized by the CPU 1 will depend on the particular type of application being compiled, a description of which is entered by the user via the user interface 6. In accordance with the present invention, the rule sets were developed utilizing performance-tuning knowledge and experience of performance tuning experts who have knowledge and experience with the particular type of application for which the rules were developed. Thus, when user information is available, the rule set utilized by the present invention will depend on the particular application, or application type, being compiled.

In addition to utilizing compile-time and user information, the present invention may also utilize profile information 13 obtained during execution of the program to determine which compiler options should be applied when compiling a particular application. The profile information 13 is used by the optimization program 10 to determine the relative importance of various routines and modules in the program being compiled, which in turn is used by the optimization program to determine whether an option that appears profitable for a particular routine or module might also be beneficial for the application as a whole. Profile information may include, for example, dynamic execution time percentages and the dynamic number of calls between caller/callee pairs, as will be understood by those skilled in the art.

The present invention then utilizes this profile information in combination with any compile-time and user information to provide either a single set of compiler option recommendations that are tailored for the program as a whole, or to provide recommendations for each individual module of the program. Providing compiler option recommendations for each individual module allows the user to optimize hot modules (those which are frequently accessed) aggressively and cold modules (those which are infrequently accessed) less aggressively or not at all in order to reduce compile-time and to reduce the risk of problems arising when code is written in a poor programming style. The CPU 1 then displays the recommendations to the user on display 8. If the user decides to compile with the recommended options, the user makes the appropriate selection to cause the CPU 1 to compile with the new options, as indicated by block 14. Once the program has been compiled with the new options, it can be executed with the new options, as indicated by block 16.

Figure 3A:
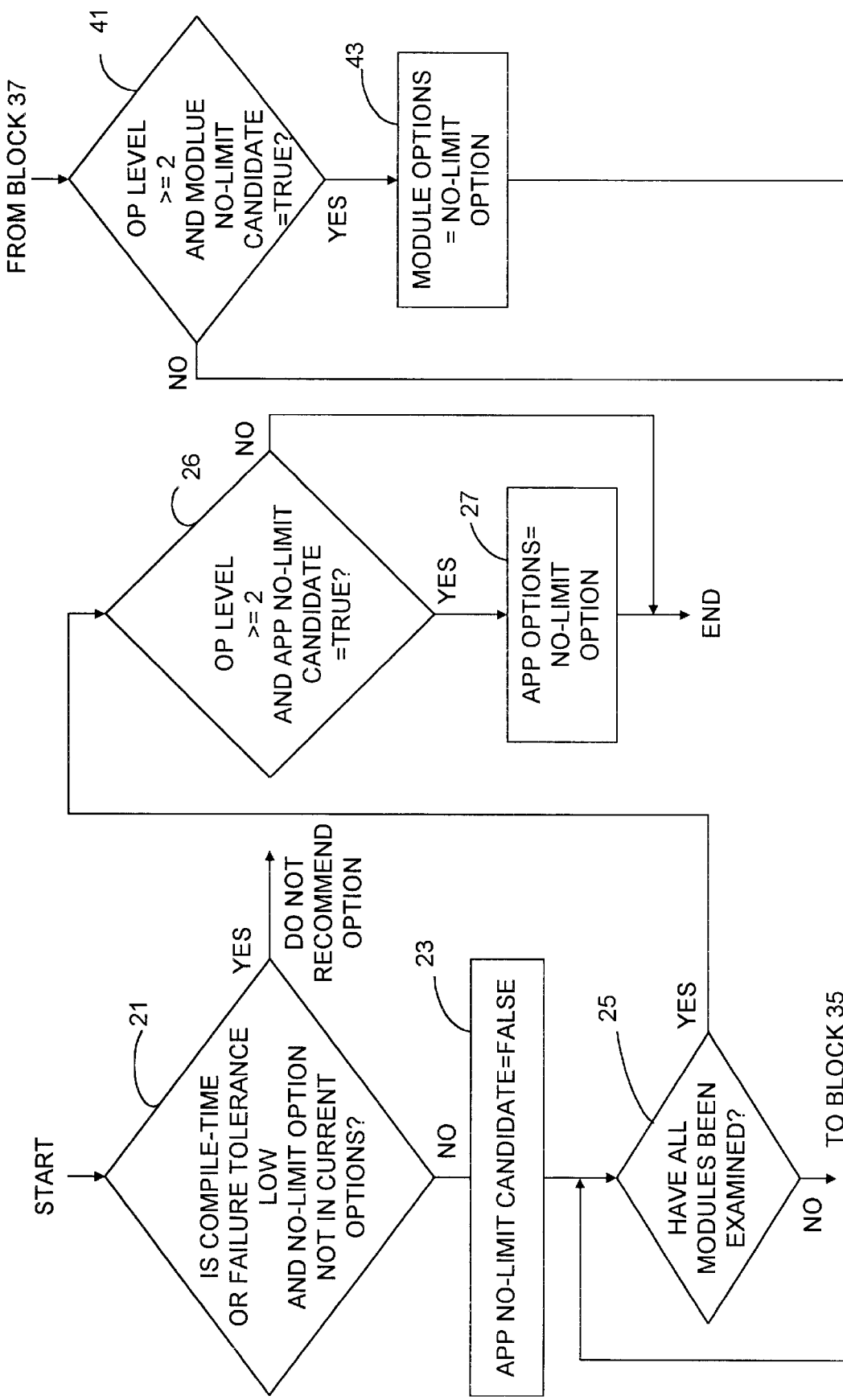
FIGS. 3A and 3B together constitute a flow chart which demonstrates an example of a set of rules utilized by the present invention in combination with application-specific information to determine whether a particular compiler option should be applied.
Figure 3B:
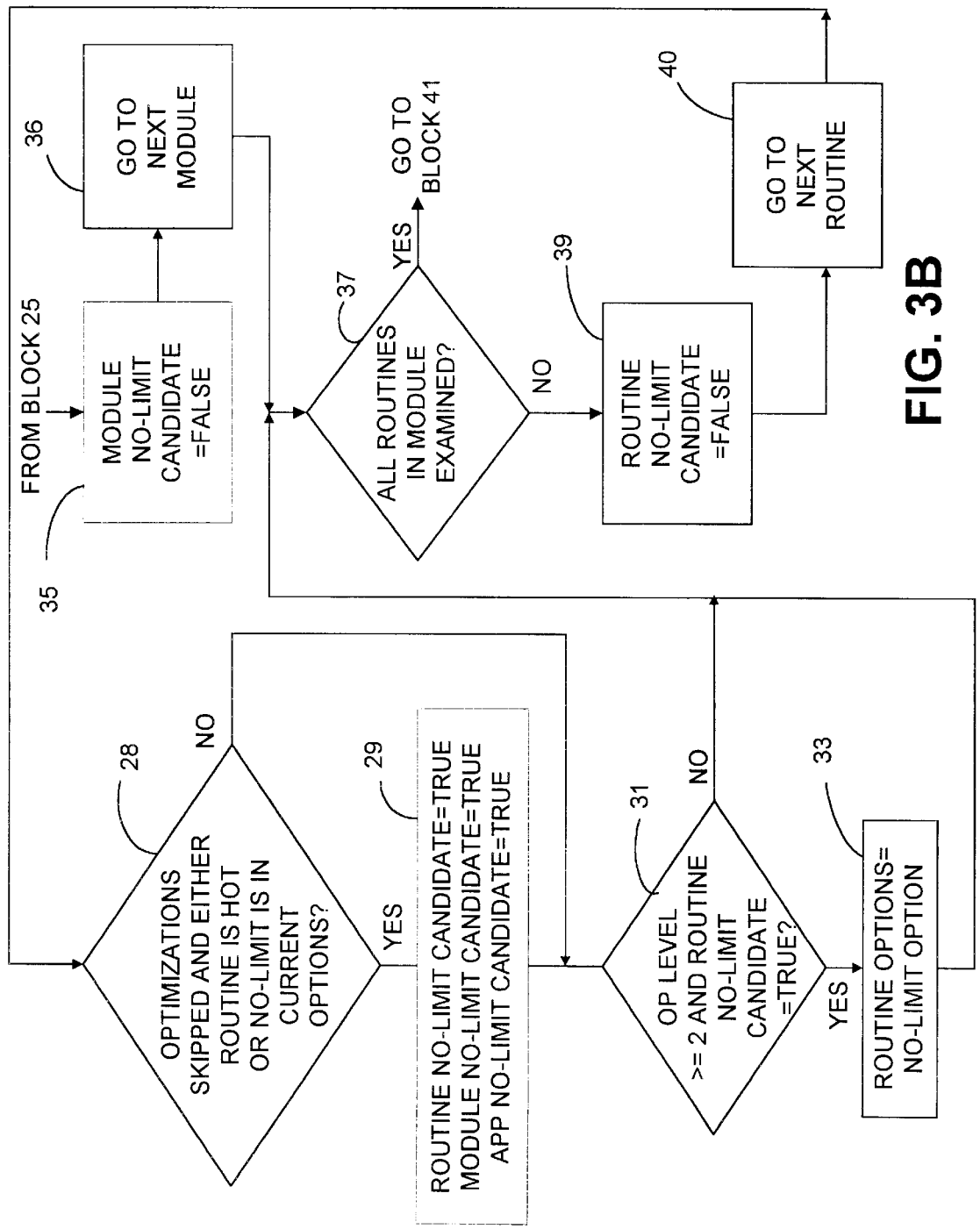

FIGS. 3A and 3B together constitute a flow chart demonstrating an example of the method of the present invention for automatically determining whether a particular compiler option is to be applied. In accordance with this example, compile-time information, user information and profile information are utilized by the present invention to determine whether the compiler is to recommend an option which ignores time and resource constraints. This option will be referred to in the example as the "no limit" option. Most compilers comprise such an option, although the name of the option may vary from compiler to compiler.

Normally, compilers attempt to achieve a balance between run time and compile time while ensuring that the compiler does not run out of memory. Occasionally, this can cause the compiler not to attempt certain optimizations. Turning on the no-limit option directs the compiler to ignore time and resource constraints. However, it is preferable only to enable this option for performance-critical modules where potentially significant optimizations are being skipped. The optimization routine of the present invention automatically determines which modules, if any, might benefit from enabling the no-limit option by analyzing compile-time information to identify candidate routines where potentially significant optimization opportunities are being skipped. Profile data is utilized by the optimization routine of the present invention to restrict the candidate set to routines that are performance-critical. Because there are risks associated with this particular option, the optimization routine of the present invention also utilizes user information, including the user's failure tolerance and compile-time tolerance, as well as whether the options the user is currently using already include the no-limit option. If the options currently being utilized for a particular module include the no-limit option, the no-limit option is deemed to be trivially safe for that module and, therefore, no failure risk is associated with enabling the option for that particular module.

When using the optimization routine of the present invention to determine whether the no-limit option is to be applied, the user's compile-time tolerance is assigned a value of either "low", "medium" or "high". A value of low indicates that reducing compile time should be a primary goal. Consequently, the optimization routine of the present invention does not recommend the no-limit option when the compile-time tolerance is low, regardless of whether the option is included in the user's current options. When the compile-time tolerance is either medium or high, the optimization routine continues to recommend the no limit option where ever it is currently being recommended, because it assumes that the user had a reason for enabling it. The optimization routine also recommends using the no-limit option for all modules which contain candidate routines for the no-limit option when the compile-time tolerance is either medium or high. What constitutes a candidate routine will become apparent from the discussion of FIGS. 3A and 3B below.

As stated above, if failure tolerance is low, the no-limit option is not recommended by the optimization routine. However, if the failure tolerance is high, the optimization routine recommends the no-limit option for the entire application provided that the no-limit option has been recommended for at least one module of the application. If the compile-time tolerance is low, the optimization routine of the present invention does not recommend the no-limit option for the application. If the compile-time tolerance is either medium or high, the optimization routine determines whether the user's failure tolerance is low. If the user's failure tolerance is low, the no limit option is not recommended for the application.

As shown in FIG. 3A, the optimization routine of the present invention first determines whether either the compile-time tolerance or failure tolerance is low and whether the no-limit option is an option currently being used by the user, as indicated by block 21. If either the compile-time tolerance or the failure tolerance is low and the no-limit option is not a current option, then the no-limit option will not be recommended. If either the compile-time tolerance or the failure tolerance is medium or high and the no-limit option is a current option, the APP NO-LIMIT CANDIDATE variable is initialized as false at block 23 and the process proceeds to block 25 where a determination is made as to whether all of the modules in the application have been examined. If all of the modules have been examined, the routine determines whether the optimization level is at least 2 and whether the APP NO-LIMIT CANDIDATE variable is true, as indicated by block 26. If not, the routine ends and the no-limit option is not recommended. If so, the process proceeds to block 27 where APP OPTIONS, the options set for the application, is updated to include option no-limit.

If at block 25 the routine determines that all modules have not yet been examined, the process proceeds to block 35 in FIG. 3B, where the MODULE NO-LIMIT CANDIDATE variable is assigned a value of false. The process then proceeds to block 36 where the process is incremented to examine the next module in the routine. The process then proceeds to block 37 where a determination is made as to whether all of the routines in the module have been examined. If at block 37 a determination is made that all routines in the module have already been examined, the process returns to block 41 in FIG. 3A. At block 41, the process determines whether the optimization level is 2 or greater and whether the MODULE NO-LIMIT CANDIDATE variable is true. If not, the process proceeds to step 25 where a determination is once again made as to whether all modules have been examined. If the result of block 41 is "yes", the process proceeds to block 43 where the options for that module are updated to include the no-limit option. The process then proceeds to block 25, where the determination discussed above is made.

If at block 37 in FIG. 3B the process determines that all routines in the module have not been examined, the process proceeds to block 39 where the ROUTINE NO-LIMIT CANDIDATE variable is assigned a value of false. The process then proceeds to block 40 where the process is incremented to examine the next routine in the module. The process then proceeds to block 28. At block 28, a determination is made as to whether optimizations have been skipped in the current routine and whether either the routine is "hot" or the no-limit option is included in the current options. If so, the process proceeds to block 29 where the ROUTINE NO-LIMIT CANDIDATE, MODULE NO-LIMIT CANDIDATE, and APP NO-LIMIT CANDIDATE variables are assigned a value of true. If not, the process proceeds to block 31 where a determination is made as to whether the optimization level for the routine is at least 2 and the ROUTINE NO-LIMIT CANDIDATE variable has already been assigned a value of true. If so, the process proceeds to block 33 where the options set for the routine is updated to include the no-limit option. If not, the process proceeds to block 37 where a determination is made as to whether all of the routines within the current module have been examined, as discussed above.

Therefore, in the example demonstrated by FIGS. 3A and 3B, the optimization routine of the present invention analyzes each routine of each module and determines whether the no-limit option should be recommended for each routine.

For each routine, compile-time information is used to determine whether optimizations are being skipped in the routine being examined. Profile information is then used to determine whether the routine being examined is "hot", i.e., how often the routine is being called. User information is entered by the user indicating whether the no-limit option is an option currently contained in the user's current set of compiler options for the application. All of this information is utilized in block 28 of FIG. 3B for each routine to determine whether the no-limit option should be recommended for the routine being examined. If the optimization routine of the present invention determines that the no-limit option should be recommended for a particular routine, then the no-limit option is also recommended for the module which contains the routine, as indicated by block 29. If the no-limit option is recommended for at least one module, then the no-limit option is recommended for the entire application if the user's failure tolerance is high (step not shown).

The optimization level used by the optimization routine of the present invention can be determined in a number of ways. The optimization level may be selected by the compiler user and input to the CPU 1 via the user interface 6. Alternatively, the optimization level may be automatically determined by the CPU 1 based on user information and/or compile-time information and/or profile information in a manner analogous to the manner in which the CPU 1 determines which compiler options to apply. The task of selecting an optimization level is well known in the art. It will be apparent to those skilled in the art the manner in which an optimization level is selected by a compiler user or determined automatically by the CPU 1 in view of the discussions provided herein.

It should be noted that the present invention has been described above with respect to the preferred embodiments but that the present invention is not limited with respect to these embodiments. It will be apparent to those skilled in the art that modifications may be made to the embodiments discussed above which are within the spirit and scope of the present invention.

What is claimed is:

1. An apparatus for automatically determining whether at least one compiler option should be enabled, the apparatus comprising:

a computer running a compiler optimization routine, the computer utilizing a compiler program to compile a computer program, the computer obtaining compile-time information during at least one compilation of the computer program, and a user interface coupled to the computer, the optimization routine utilizing the compile-time information to determine whether said at least one compiler option should be enabled during a subsequent compilation of the computer program to improve compiler performance, the optimization routine causing a compiler option recommendation to be output to the user via the user interface, the compiler option recommendation recommending which, if any, compiler options should be enabled during a subsequent compilation of the computer program.

2. The apparatus of claim 1, wherein the user interface receives user information input into the user interface by a compiler user, the computer receiving the user information from the user interface, the optimization routine utilizing the user information in conjunction with the compile-time information to determine whether said at least one compiler option should be enabled during a subsequent compilation of the computer program to improve compiler performance.

3. The apparatus of claim 2, wherein the computer obtains profile information relating to the computer program, the profile information being obtained by the computer during an execution of the computer program, the optimization routine utilizing the profile information in conjunction with the user information and the compile-time information to determine whether said at least one compiler option should be enabled during a subsequent compilation of the computer program to improve compiler performance.

4. The apparatus of claim 2, wherein the user information corresponds to a designation of a particular type of program to which the computer program corresponds.

5. The apparatus of claim 2, wherein the user information corresponds to a programming style used by a designer who developed the computer program.

6. The apparatus of claim 2, wherein the user information corresponds to a failure tolerance of the user, the failure tolerance relating to willingness of the user to accept a failure resulting during compilation of the computer program.

7. The apparatus of claim 2, wherein the user information corresponds to a compile-time tolerance of the user, the compile-time tolerance relating to willingness of the user to wait an amount of time for the computer program to be compiled by the computer.

8. The apparatus of claim 1, wherein the compile-time information relates to a language in which the computer program is written.

9. The apparatus of claim 8, wherein the profile information relates to a percentage of time spent in each routine of the computer program during the execution of the computer program.

10. The apparatus of claim 8, wherein the profile information relates to a number of times that a particular call site in the computer program was called during the execution of the computer program.

11. The apparatus of claim 1, wherein the compile-time information relates to sizes of modules and routines of the computer program.

12. The apparatus of claim 1, wherein the compile-time information relates to compiler options currently being used to compile the computer program.

13. The apparatus of claim 1, wherein the compile-time information relates to compiler options which are enabled during compilation of the computer program but which are not taking effect during compilation of the computer program.

14. The apparatus of claim 1, wherein the compile-time information relates to compiler options which are enabled during compilation of the computer program and which are taking effect during compilation of the computer program.

15. The apparatus of claim 1, wherein the compile-time information relates to a determination by the computer as to whether inter-procedural analysis will improve compiler performance.

16. An apparatus for automatically determining whether a compiler option should be enabled, the apparatus comprising:

a user interface for receiving information from a compiler user and for outputting information to the compiler user; and a computer running a compiler optimization routine, the computer coupled to the user interface for receiving information from the user interface and for outputting information to the user interface, the computer receiving user information from the user interface, the optimization routine utilizing the user information to determine whether at least one compiler option should be enabled during a subsequent compilation of the computer program to improve compiler performance, the optimization routine causing a compiler option recommendation to be output to the user via the user interface, the compiler option recommendation recommending which, if any, compiler options should be enabled during a subsequent compilation of the computer program.

17. The apparatus of claim 16, the computer utilizing a compiler program to compile a computer program, wherein the computer obtains compile-time information during at least one compilation of the computer program, the optimization routine utilizing the compile-time information in conjunction with the user information to determine whether said at least one compiler option should be enabled during a subsequent compilation of the computer program.

18. The apparatus of claim 17, wherein the computer obtains profile information relating to the computer program, the profile information being obtained by the computer during an execution of the computer program, the optimization routine utilizing the profile information in conjunction with the user information and the compile-time information to determine whether said at least one compiler option should be enabled during a subsequent compilation of the computer program to improve compiler performance.

19. The apparatus of claim 18, wherein the user information includes information relating to a designation of a particular type of program to which the computer program corresponds.

20. The apparatus of claim 19, wherein the user information includes information relating to a programming style used by a designer who developed the computer program.

21. The apparatus of claim 20, wherein the user information includes information relating to a failure tolerance of the user, the failure tolerance relating to willingness of the user to accept a failure resulting during compilation of the computer program.

22. The apparatus of claim 21, wherein the user information includes information relating to a compile-time tolerance of the user, the compile-time tolerance relating to willingness of the user to wait an amount of time for the computer program to be compiled by the computer.

23. The apparatus of claim 18, wherein the profile information includes information relating to a percentage of time spent in each routine of the computer program during the execution of the computer program.

24. The apparatus of claim 23, wherein the profile information includes information relating to a number of times that a particular call site in the computer program was called during the execution of the computer program.

25. The apparatus of claim 17, wherein the compile-time information includes information relating to a language in which the computer program is written.

26. The apparatus of claim 25, wherein the compile-time information includes information relating to sizes of modules and routines of the computer program.

27. The apparatus of claim 26, wherein the compile-time information includes information relating to compiler options currently being used to compile the computer program.

28. The apparatus of claim 27, wherein the compile-time information includes information relating to compiler options which are enabled during compilation of the computer program but which are not taking effect during compilation of the computer program.

29. The apparatus of claim 28, wherein the compile-time information includes information relating to compiler options which are enabled during compilation of the computer program and which are taking effect during compilation of the computer program.

30. The apparatus of claim 29, wherein the compile-time information includes information relating to a determination by the computer as to whether inter-procedural analysis will improve compiler performance.

31. An apparatus for automatically determining whether a compiler option should be enabled, the apparatus comprising:

a computer running a compiler optimization routine, the computer obtaining profile information relating to the computer program, the profile information being obtained by the computer during an execution of the computer program, the optimization routine utilizing the profile information to determine whether at least one compiler option should be enabled during a subsequent compilation of the computer program to improve compiler performance; and a user interface coupled to the computer, the optimization routine causing a compiler option recommendation to be output to the user via the user interface, the compiler option recommendation recommending which, if any, compiler options should be enabled during a subsequent compilation of the computer program.

32. The apparatus of claim 31, the computer utilizing a compiler program to compile the computer program, wherein the computer obtains compile-time information during at least one compilation of the computer program, the optimization routine utilizing the compile-time information in conjunction with the profile information to determine whether said at least one compiler option should be enabled during a subsequent compilation of the computer program.

33. A method for automatically determining whether a compiler option should be enabled during a compilation of a computer program, the method comprising the steps of:

utilizing a compiler program in a computer to compile a computer program;

obtaining compile-time information during at least one compilation of the computer program;

utilizing the compile-time information in a compiler optimization routine to determine whether said at least one compiler option should be enabled during a subsequent compilation of the computer program to improve compiler performance; and outputting a compiler option recommendation via a user interface coupled to the computer, the compiler option recommendation being based on the determination of whether said at least one compiler option should be enabled.

34. The method of claim 33, further comprising the step of receiving user information in the computer, the user information being input into the user interface by a compiler user, the optimization routine utilizing the user information in conjunction with the compile-time information to determine whether said at least one compiler option should be enabled during a subsequent compilation of the computer program to improve compiler performance.

35. The method of claim 34, further comprising the step of receiving profile information in the computer, the profile information relating to the computer program, the profile information being obtained by the computer during an execution of the computer program, the optimization routine utilizing the profile information in conjunction with the user information and the compile-time information to determine whether said at least one compiler option should be enabled during a subsequent compilation of the computer program to improve compiler performance.

36. The method of claim 35, wherein the profile information includes information relating to a percentage of time spent in each routine of the computer program during the execution of the computer program.

37. The method of claim 35, wherein the profile information includes information relating to a number of times that a particular call site in the computer program was called during the execution of the computer program.

38. The method of claim 34, wherein the user information includes information relating to a designation of a particular type of program to which the computer program corresponds.

39. The method of claim 34, wherein the user information includes information relating to a programming style used by a designer who developed the computer program.

40. The method of claim 34, wherein the user information includes information relating to a failure tolerance of the user, the failure tolerance relating to willingness of the user to accept a failure resulting during compilation of the computer program.

41. The method of claim 34, wherein the user information includes information relating to a compile-time tolerance of the user, the compile-time tolerance relating to willingness of the user to wait an amount of time for the computer program to be compiled by the computer.

42. The method of claim 33, wherein the compile-time information includes information relating to a language in which the computer program is written.

43. The method of claim 33, wherein the compile-time information includes information relating to sizes of modules and routines of the computer program.

44. The method of claim 33, wherein the compile-time information includes information relating to compiler options currently being used to compile the computer program.

45. The method of claim 33, wherein the compile-time information includes information relating to compiler options which are enabled during compilation of the computer program but which are not taking effect during compilation of the computer program.

46. The method of claim 33, wherein the compile-time information includes information relating to compiler options which are enabled during compilation of the computer program and which are taking effect during compilation of the computer program.

47. The method of claim 33, wherein the compile-time information includes information relating to a determination by the computer as to whether inter-procedural analysis will improve compiler performance.

48. A method for automatically determining whether a compiler option should be enabled during compilation of a computer program, the method comprising the steps of:

receiving user information in a computer, the user information being input into the computer via a user interface;

utilizing the user information in a compiler optimization routine running on the computer to determine whether at least one compiler option should be enabled during a subsequent compilation of the computer program to improve compiler performance; and outputting a compiler option recommendation via a user interface coupled to the computer, the compiler option recommendation being based on the determination of whether said at least one compiler option should be enabled.

49. The method of claim 48, further comprising the steps of:

compiling the computer program;

obtaining compile-time information during at least one compilation of the computer program; and utilizing the compile-time information in the optimization routine in conjunction with the user information to determine whether said at least one compiler option should be enabled during a subsequent compilation of the computer program.

50. The method of claim 1, further comprising the step of executing the computer program to obtain profile information relating to the computer program, the optimization routine utilizing the profile information in conjunction with the user information and the compile-time information to determine whether said at least one compiler option should be enabled during a subsequent compilation of the computer program to improve compiler performance.

51. A method for automatically determining whether a compiler option should be enabled during compilation of a computer program, the method comprising the steps of:

obtaining profile information relating to the computer program during an execution of the computer program in a computer;

utilizing the profile information in an optimization routine being executed by the computer to determine whether at least one compiler option should be enabled during a subsequent compilation of the computer program to improve compiler performance; and outputting a compiler option recommendation via a user interface coupled to the computer, the compiler option recommendation being based on the determination of whether said at least one compiler option should be enabled.

52. The method of claim 51, further comprising the step of compiling the computer program in the computer to obtain compile-time information during compilation of the computer program, wherein the optimization routine utilizes the compile-time information in conjunction with the profile information to determine whether said at least one compiler option should be enabled during a subsequent compilation of the computer program.

* * * * *

UNITED STATES PATENT AND TRADEMARK OFFICE
CERTIFICATE OF CORRECTION

PATENT NO. : 5,966,538
DATED : Oct. 12, 1999
INVENTOR(S) : Granston et al.

It is certified that error appears in the above-indentified patent and that said Letters Patent is hereby corrected as shown below:

Column 4, Line 23, Should start a new paragraph

Claim 50, should be dependent on Claim 48

Signed and Sealed this

Tenth Day of April, 2001

*Attest:*

NICHOLAS P. GODICI

*Attesting Officer*     *Acting Director of the United States Patent and Trademark Office*